(12) United States Patent
Silberman

(10) Patent No.: US 11,106,469 B2
(45) Date of Patent: Aug. 31, 2021

(54) INSTRUCTION SELECTION MECHANISM WITH CLASS-DEPENDENT AGE-ARRAY

(71) Applicant: International Business Machines Corporation, Armonk, NY (US)

(72) Inventor: Joel A. Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/540,489

(22) Filed: Aug. 14, 2019

(65) Prior Publication Data

US 2021/0049018 A1 Feb. 18, 2021

(51) Int. Cl.
*G06F 9/38* (2018.01)

(52) U.S. Cl.
CPC .................... *G06F 9/3855* (2013.01)

(58) Field of Classification Search
CPC .... G06F 9/3855; G06F 9/3836; G06F 9/3802; G06F 9/3838
See application file for complete search history.

(56) References Cited

U.S. PATENT DOCUMENTS

| | | | |
|---|---|---|---|
| 5,835,747 A | 11/1998 | Trull | |
| 6,282,636 B1 * | 8/2001 | Yeh | G06F 9/3861 712/218 |
| 6,557,095 B1 * | 4/2003 | Henstrom | G06F 9/3836 712/207 |
| 6,785,802 B1 * | 8/2004 | Roy | G06F 9/3836 712/216 |
| 7,284,094 B2 | 10/2007 | Hrusecky et al. | |
| 7,711,929 B2 | 5/2010 | Burky et al. | |
| 8,285,974 B2 | 10/2012 | Singh et al. | |
| 8,489,863 B2 | 7/2013 | Bishop et al. | |
| 9,755,994 B2 | 9/2017 | Fetterman et al. | |
| 2006/0179227 A1 | 8/2006 | Hrusecky et al. | |
| 2008/0082794 A1 | 4/2008 | Yu et al. | |
| 2008/0320478 A1 | 12/2008 | Singh et al. | |
| 2009/0063823 A1 | 3/2009 | Burky et al. | |
| 2010/0293347 A1 * | 11/2010 | Luttrell | G06F 9/3834 711/156 |
| 2012/0260069 A1 | 10/2012 | Bishop et al. | |
| 2012/0291037 A1 * | 11/2012 | Venkataramanan | G06F 9/3855 718/103 |

(Continued)

*Primary Examiner* — William B Partridge
*Assistant Examiner* — Courtney P Carmichael-Moody
(74) *Attorney, Agent, or Firm* — Scully, Scott, Murphy & Presser, P.C.; Daniel P. Morris

(57) ABSTRACT

Methods and systems for implementing an instruction selection mechanism with class-dependent age-array are described. In an example, a system can include a processor that may sequence instructions. The system can further include a memory operatively coupled to the processor. The system can further include an array allocated on the memory. The array can be operable to store instruction age designations associated with a plurality of instructions sequenced by the processor. The array can be further operable to store the instruction age designations based on instruction classes. The processor can be operable to fetch an instruction from the memory. The processor can be operable to dispatch the instruction to a queue. The processor can be operable to store the instruction age designations associated with the instruction, in the array, based on an instruction class of the instruction.

20 Claims, 5 Drawing Sheets

(56) References Cited

U.S. PATENT DOCUMENTS

| | | | |
|---|---|---|---|
| 2013/0311686 A1 | 11/2013 | Fetterman et al. | |
| 2014/0129806 A1* | 5/2014 | Kaplan | G06F 9/3824 |
| | | | 712/220 |
| 2015/0007188 A1* | 1/2015 | Sutanto | G06F 9/4881 |
| | | | 718/104 |
| 2016/0371091 A1* | 12/2016 | Brownscheidle | G06F 9/3855 |

* cited by examiner

INSTRUCTION SELECTION MECHANISM WITH CLASS-DEPENDENT AGE-ARRAY

BACKGROUND

The present disclosure relates in general to processors, and more specifically, to processors that employ issue queues with instruction age tracking mechanisms.

An out-of-order processor can issue and execute instructions out of order as resources and operands become available. As multiple out-of-order instructions are queued to be issued, age tracking can be used to track older and younger instructions. The instruction age corresponds to a dispatch order of an instruction relative to other instructions in the same issue queue. For example, the last instruction being dispatched into an issue queue can be the youngest instruction in that issue queue.

SUMMARY

In some examples, an apparatus for tracking instruction age is generally described. The apparatus can include a processor operable to at least sequence instructions. The apparatus can further include a memory operatively coupled to the processor. The apparatus can further include an array allocated on the memory. The array can be operable to store instruction age designations associated with a plurality of instructions sequenced by the processor. The array can be operable to store the instruction age designations based on instruction classes.

In some examples, a method for tracking instruction age is generally described. The method can include fetching an instruction from a memory. The method can further include dispatching the instruction to a queue. The method can further include storing instruction age designations associated with the instruction, in an array allocated in the queue, based on an instruction class of the instruction.

In some examples, a system can include a processor that may sequence instructions. The system can further include a memory operatively coupled to the processor. The system can further include an array allocated on the memory. The array can be operable to store instruction age designations associated with a plurality of instructions sequenced by the processor. The array can be further operable to store the instruction age designations based on instruction classes. The processor can be operable to fetch an instruction from the memory. The processor can be operable to dispatch the instruction to a queue. The processor can be operable to store the instruction age designations associated with the instruction, in the array, based on an instruction class of the instruction.

In some examples, a computer program product for tracking instruction age is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In some examples, a processor can include one or more instruction sequencing units (ISUs) configured to manage instructions fetched from memory that can be executed by the processor. An ISU can include mappers configured to rename registers, dispatch units to dispatch renamed instructions into issue queues, global completion table that tracks status of instructions, and/or other components. An issue queue can include dependency arrays that track dependency between instructions, and age arrays that track instruction age of instructions. The issue queues can issue the instructions out of order, e.g., in a different order from the receipt order of the instructions by the issue queue. The issue queues can issue instructions to execution units as soon as operands and various resources required to execute the instruction are ready and/or available. In an example, if multiple instructions are considered as ready, the oldest instruction will be given a priority and will be issued to an execution unit before other ready instructions. The issue queues can issue instructions of different types or instruction classes simultaneously. For example, an issue queue can issue a load instruction to a load execution unit and a store instruction to a store execution unit simultaneously.

In some examples, an issue queue can track instruction age for more than one class or type of instructions, such as fixed point, load, store, vector, floating point, branch, and/or other types of instructions. In some examples, the issue queue can include one age array for each instruction class. In another example, one age array can track the age of all instructions in the queue, but may require separate means to determine the age of instructions within an issue class. To be described in more detail below, a class-dependent age array can be integrated into one or more issue queues, where one copy of the class-dependent age array can be utilized to track instruction age. By using one copy of the class-dependent age array to track instruction age, the amount of memory being used to store age arrays can be reduced. Further, a number of write operations to update the age array can also be reduced, and the selection logic being used to select instructions for issue can operated based on ready bits that are independent from instruction class, thus reducing latch clocking and consumption of power resources.

Figure 1:
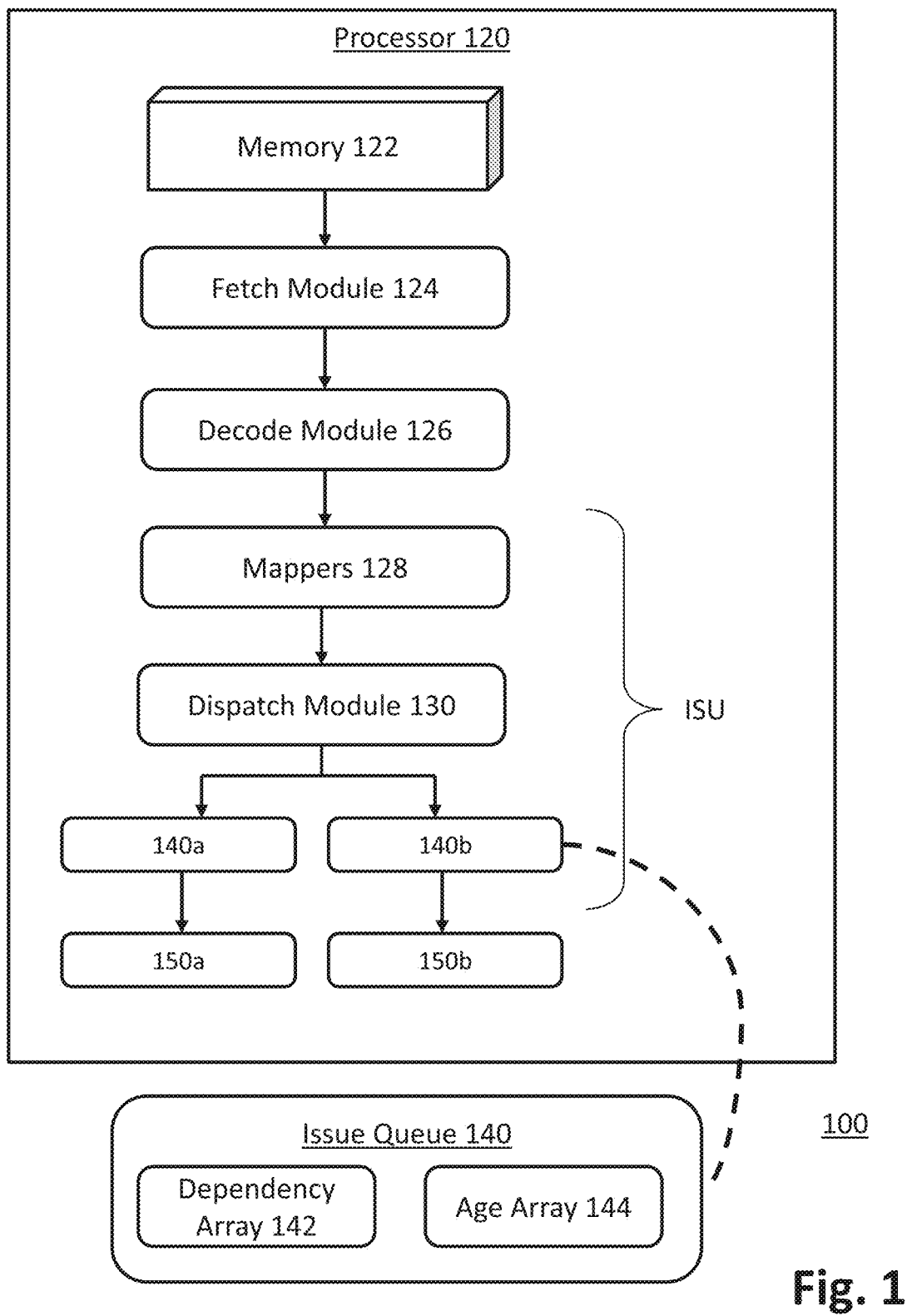
FIG. 1 is a diagram showing an example computer system that can implement an instruction selection mechanism with class-dependent age-array in one embodiment.

FIG. 1 is a diagram showing an example computer system 100 that can implement an instruction selection mechanism with class-dependent age-array in one embodiment. The system 100 can include a processor 120. The processor 120 can be an out-of-order processor configured to issue and execute instructions out of order. In some examples, the processor 120 can be a microprocessor. The processor 120 can include various units, modules, registers, buffers, memories, and other components. For example, the processor 120 shown in FIG. 1 includes a memory 122, a fetch module 124, a decode module 126, one or more mappers 128, a dispatch module 130, one or more issue queues 140a, 140b, and one or more execution units 150a, 150b. In some examples, the mapper modules 128, the dispatch module 130, and the issue queues 140a, 140b, may form an instruction sequencing unit (ISU) of the processor 120. Thus, the ISU can fetch instructions, rename registers in support of out-of-order executions, dispatch ready instructions to various issue queues, and issue instructions from the various issues queues to the execution units.

In some examples, the memory 122 may be an instruction cache of the processor 120 configured to store processor instructions (or instructions). In some examples, the memory 122 may be a portion of a system memory of the system 100. Processor instructions can include, for example, an instruction stream including a series or sequence of instructions. In an example, the memory 122 can receive instructions from a system memory of the system 100, a non-volatile storage device, an expansion bus, a network interface, or other sources configured to provide instructions. The memory 122 may be configured to be in communication with the fetch unit or module 124. The fetch module 124 may be configured to fetch one or more instructions from the memory 122.

The fetch module 124 may be configured to be in communication with the decode unit or module 126. The decode module 126 may be configured to decode the instructions fetched by the fetch module 124. For example, the decode module 126 can determine a class or type of an instruction. The decode module 126 can augment an instruction with additional bits that identifies the type of the instruction or that indicates the type of execution unit needed to execute the instruction. In some examples, the additional bit can also indicate whether or not the instruction needs to make a memory reference.

The decode module 126 may be configured to be in communication with one or more mappers 128. A mapper may be configured to execute mapper logic to rename registers before the instructions are dispatched to their respective issue queues. Register renaming provides a mapping between logical registers (or architectural registers, or virtual registers) and physical registers of the processor 120. For example, the mappers 128 can rename registers that holds instruction results until the instructions are retired. The renaming of registers can eliminate anti-dependencies and output dependencies in the instruction streams.

The mapper modules 128 may be configured to be in communication with a dispatch unit or module 130. The dispatch module 130 may be configured to dispatch instructions to one or more issue queues. In some examples, the dispatch module 130 may be coupled to a dispatch buffer, such that the instructions are queued in the dispatch buffer and wait to be dispatched by the dispatch module 130. The dispatch module 130 can identify an instruction as ready for dispatch in response to availability of the instruction's required resources, such as output register, and instruction tracking (completion table) entry. In some examples, the system 100 can be configured such that load instructions may be given a priority to be dispatched to issue queues.

The dispatch module 130 may be configured to be in communication with one or more issue queues, such as issue queues 140a, 140b. An issue queue can be configured to store instructions of a particular class or type, or can be configured to store instructions of one class. For example, the issue queue 140a can be an issue queue for branch instructions, and the issue queue 140b can be an issue queue for load, store, vector/scalar instructions. The number of issue queues, and the number of instruction classes being managed by each issue queue, can be dependent on a desired implementation of the system 100. Note that the instructions stored in the issue queues 140a, 140b are instructions that are eligible to be issued (as the resources they need have been allocated by the dispatch module 130).

Focusing on issue queue 140b as an example, an issue queue can include a dependency array 142 and an age array 144. The dependency array 142 and the age array 144 can be allocated on the memory 122 or a system memory of the system 100. The dependency array 142 maintains or stores dependency data for instructions stored in the issue queue 140. The dependency data may indicate whether an instruction is dependent on another instruction. For example, a first instruction may be dependent on a second instruction if an output of the second instruction is an input to the first instruction. In an example, if an issue queue is configured to store 48 instructions, then the dependency array 142 can maintain dependency data for 48 different instructions using a 48×48 matrix (48 rows and 48 columns). In an example embodiment, the dependency array 142 can be an array of binary memory cells, such as latches, operable to store one bit of data.

The age array 144 maintains or stores instruction age designations, or indications of instruction age, for instructions stored in the issue queue 140. The age array 144 can be represented as a matrix (herein "age matrix"). In an example, if an issue queue is configured to store 48 instructions, then the age array 144 can maintain age data for 48 different instructions using a 48×48 matrix (48 rows and 48 columns). In an example, a logic '1' written to an entry in the age matrix can indicate an instruction corresponding to a row of the entry is older than an instruction corresponding to a column of the entry. Similarly, a logic '0' in an entry in the age matrix can indicate an instruction corresponding to a row of the entry is younger than an instruction corresponding to a column of the entry. Different indications or notations can be used to denote whether an entry is older or younger. In an example embodiment, the age array 144 can be an array of binary memory cells, such as latches, operable to store one bit of data.

To be described in more detail below, a logic '1' can be written to particular entries of a row in the age array 144, where the row corresponds to an instruction being dispatched, and the particular entries are positioned at columns of the age array 144 that correspond to instructions of the same class or instruction type. The rest of the entries in the row are written to a logic '0', and the entries in the column corresponding to the instruction being dispatched are also written to a logic '0'. Thus, selection of instructions can be tracked for individual classes such as vector/scalar unit (VSU) instructions, loads, stores, branches, and other classes. In some examples, classes can correspond to port designations of the issue queue. The ready-for-issue status of an instruction in the queue can be an input to the determination of the oldest ready instruction to issue. With a class-dependent age-array, a class-independent ready-for-issue status can be used; whereas, in an example age-array that tracks the age of all instructions in the queue in a class-independent manner, a copy of the ready status is needed for each issue class. The former class of a replaced instruction can be used for row-clock gating for power saving in the column write, updating these instructions to have a logic '1' in the column of a new instruction. Different values can be used to denote different trackings.

The issue queues 140a and 140b can be connected to one or more execution units or processors, such as execution units 150a, 150b. The execution units 150a and 150b are respectively configured to execute instructions of a particular class or type. For example, the execution unit 150a can be configured to execute branch instructions, and the execution unit 150b can be configured to execute load instructions. The number of issue queues and execution units are configurable, and not limited to the two shown.

Figure 2:
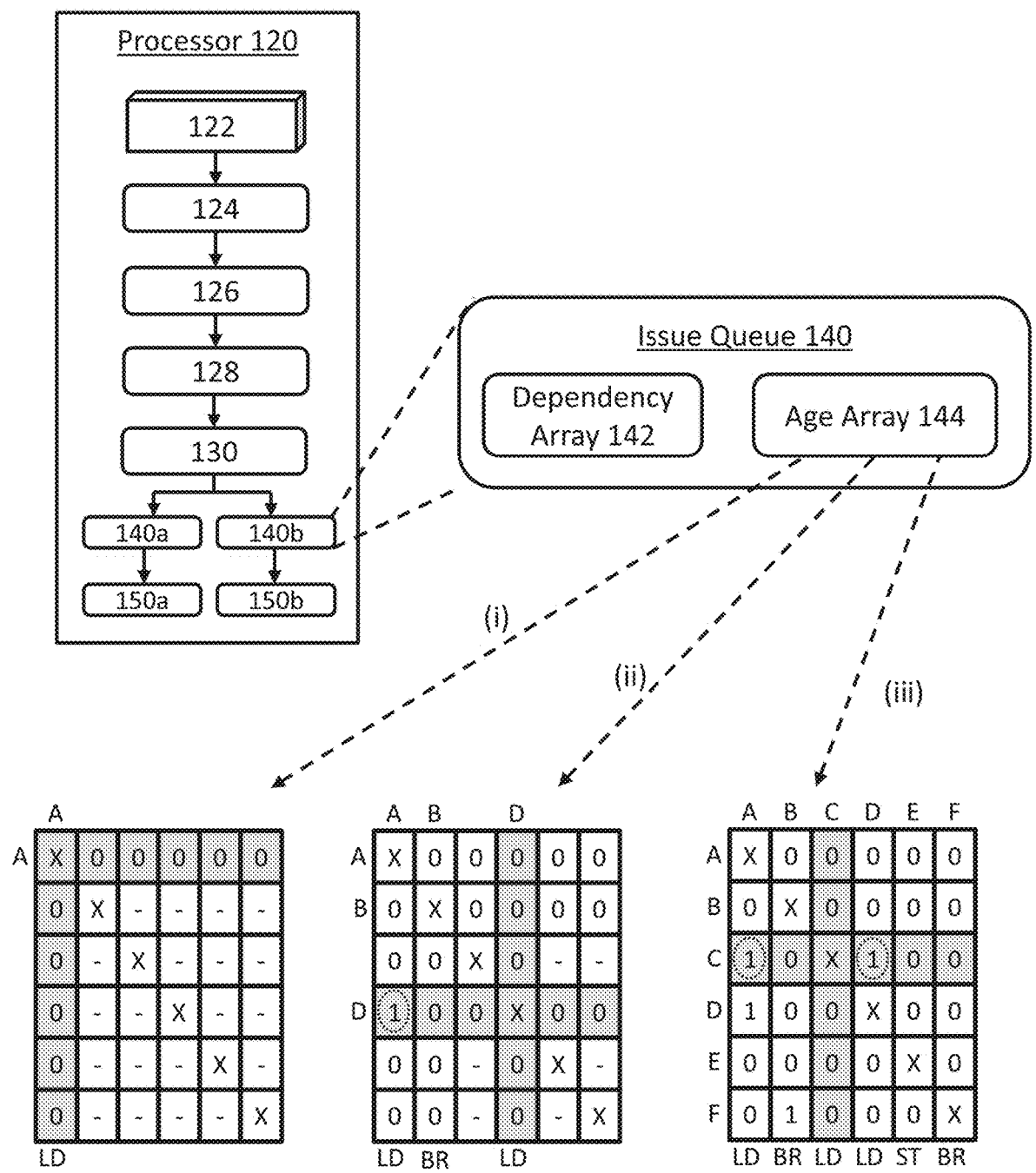
FIG. 2 is a diagram showing an example of a class-dependent age array in accordance with the present disclosure, in one embodiment.

FIG. 2 is a diagram showing an example of a class-dependent age array in accordance with the present disclosure, in one embodiment. FIG. 2 may include components that are labeled identically to components of FIG. 1, which are not described again for the purposes of clarity. The description of FIG. 2 may reference at least some of the components of FIG. 1.

Various examples are shown in FIG. 2 to illustrate a progression of the age array 144 as instructions are being dispatched into an issue queue 140. An example (i) illustrates an update of the age array 144 as a first instruction A is dispatched into the issue queue 140. An example (ii) illustrates an update of the age array 144 as an instruction D is dispatched into the issue queue 140. An example (iii) illustrates an update of the age array 144 as an instruction C is dispatched into the issue queue 140. The updates of the age array 144 shown in FIG. 2 progresses from example (i) to (ii), then to (iii). Some updates to the age array 144 between examples (i) and (ii) and between examples (ii) and (iii) are not illustrated for clarity purposes.

The age array 144 can be updated by the processor 120 as instructions are dispatched, by the dispatch module 130, into the issue queue 140. The validity of the entries in the age array can be determined by the validity of the corresponding instruction in the issue queue. The age array 144 can interpreted as empty when no instructions are stored in the issue queue 140. In the examples shown in FIG. 2, instructions A, C, and D are load (LD) instructions, instructions B and F are branch (BR) instructions, and instruction E is a store (ST) instruction. Therefore, instructions A, C, and D are of the same instruction class or type (e.g., load class or type). Similarly, instructions B and F are of the same instruction class or type (e.g., branch class or type). The diagonal entries of the age array 144 are marked as "X", which indicates that these diagonal entries can remain under a "don't care" condition, because the diagonal entries are indicative of a relative instruction age of an instruction to itself.

Focusing on example (i), the instruction A is dispatched to the issue queue 140, which is initially empty, as a first instruction. The processor 120 can be configured to determine if the issue queue 140 contains a valid instruction of the same type as the one currently being dispatched. The processor stores a '1' in all entries of row A that correspond to the queue position of a valid instruction in the queue of the same class and otherwise stores a '0' in the row entry. The entries in the column corresponding to the position of the dispatching instruction within the queue are set to '0'. As an example, when the issue queue 140 is empty, the processor 120 can store a logic '0' in all entries in row A and all entries in column A in the age array 144. In another example, when valid instructions exist in the queue and an instruction B is a first instruction of a certain class (e.g., a branch instruction) to be dispatched into the issue queue 140, the processor 120 can store logic '0' to all entries in row B and column B.

Focusing on example (ii), the instruction D is being dispatched by the dispatch module 130 into the issue queue 140, where instructions A and B are already dispatched in the issue queue 140 and tracked by the age array 144. The processor 120 can update the age array 144 to reflect instruction D's relative instruction age to other instructions of the same class (e.g., the load instruction class). For example, in response to dispatching instruction D to the issue queue 140, the processor 120 can write a logic '1' to an entry (D, A) that is positioned at row D and column A, where column A corresponds to the instruction A. The processor 120 can store a logic '0' in the rest of the entries of row D, such as the entry (D, B), that correspond to instructions of a different instruction class (e.g., instruction B is of the branch instruction class). Further, the processor 120 can store a logic '0' in entries of column D to indicate that the instruction D is the youngest instruction among its instruction class. The logic '1' written to an entry of the age array 144 indicates that an instruction corresponding to the column of the entry is older than an instruction corresponding to the row of the entry. For example, a logic '1' written to the entry (D, A) can indicate that instruction A is older than instruction D.

Focusing on example (iii), the instruction C is being dispatched by the dispatch module 130 into the issue queue 140, where instructions A, B, D, E, and F are already dispatched in the issue queue 140 and tracked by the age array 144. The processor 120 can update the age array 144 to reflect instruction C's relative instruction age to other instructions of the same class (e.g., the load instruction class). For example, in response to dispatching instruction C to the issue queue 140, the processor 120 can write a logic '1' to an entry (C, A) that is positioned at row C and column A, and to an entry (C, D) that is positioned at row C and column D, where columns A and D correspond to the instructions A and D, respectively. The processor 120 can store a logic '0' in the rest of the entries of row C, such as the entries (C, B), (C, E), and (C, F) that correspond to instructions of different instruction classes. Further, the processor 120 can store a logic '0' in entries of column C to indicate that the instruction C is the youngest instruction among its instruction class.

Note that instruction age is reflected in the age array only in a pair-wise manner. For example, in the age array 144 shown in example (iii), row A does not include any logic '1', indicating there is no instruction in the class (e.g., LD class) older than A. Row C includes two entries written with logic '1', indicating there are two instructions (e.g., A and D), each being older than C with no information within row C to indicate the relative age between the two older instructions (e.g., age of A relative to age of D). The pair-wise age encoding can be sufficient to identify the oldest ready instruction within a class for issue.

Figure 3:
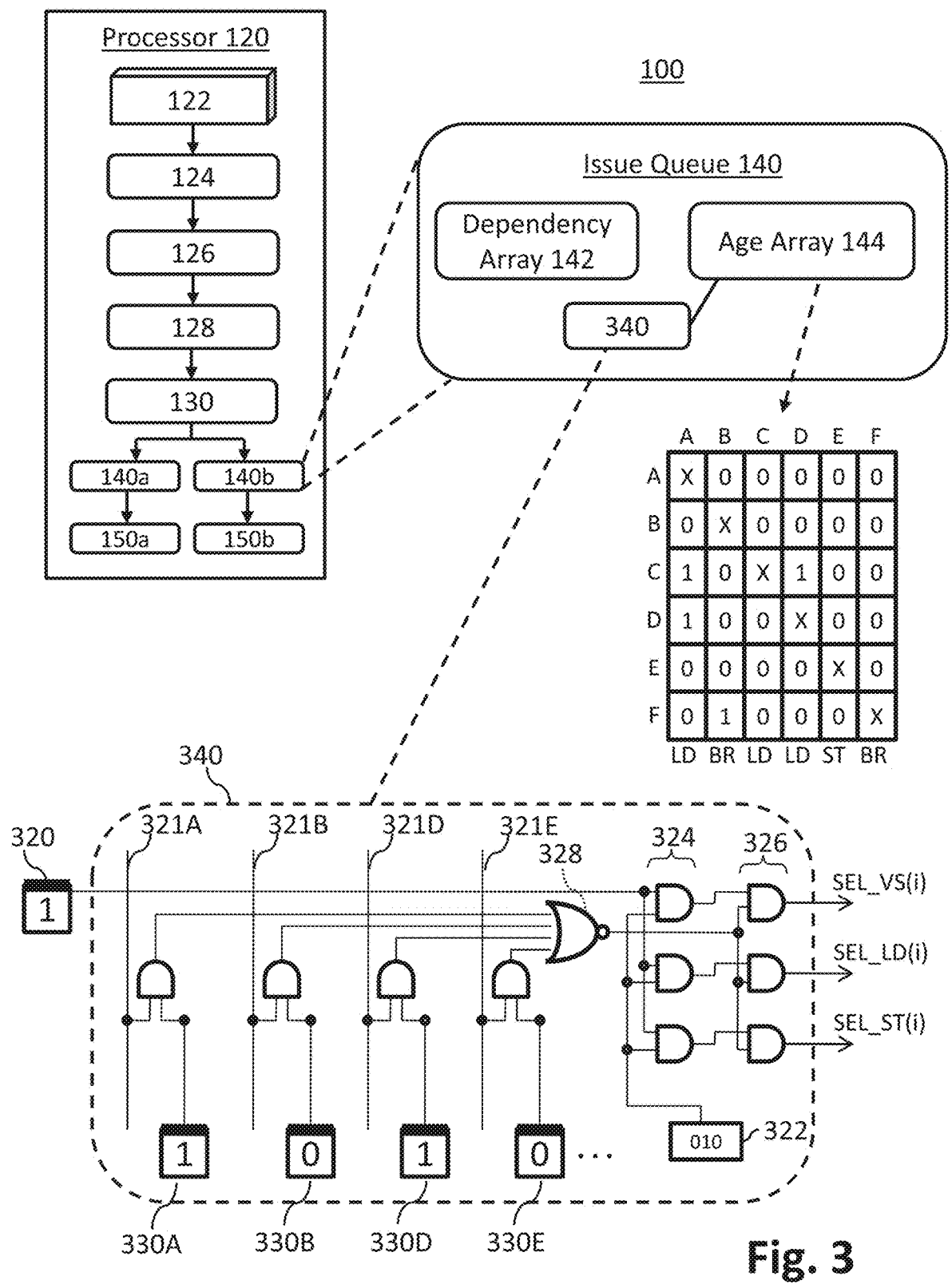
FIG. 3 is a diagram showing details of a logic block that can be implemented by the example system of FIG. 1 to update a class-dependent age array

FIG. 3 is a diagram showing details of a logic block that can be implemented by the example system of FIG. 1 to select an instruction for issue in accordance with the present disclosure, in one embodiment. FIG. 2 may include components that are labeled identically to components of FIG. 1, which are not described again for the purposes of clarity. The description of FIG. 2 may reference at least some of the components of FIG. 1.

The age array 144 can be implemented as a class-dependent age array that manage and track instruction age of instructions of multiple instructions classes. Thus, each issue queue of the processor 120 can store a copy of the age array 144 including different content. For example, the issue queue 140a can store a first class-dependent age array that manages and tracks instructions being stored in the issue queue 140a, and the issue queue 140b can store a second class-dependent age array that manages and tracks instructions being stored in the issue queue 140b. Thus, the issue queues can store one age array for multiple instruction classes, instead of one copy of age array for each instruction class.

In some examples, an issue queue can include a plurality of logic blocks operable to select an instruction from the issue queue 140 to be issued to an execution unit. In an example shown in FIG. 3, the issue queue 140 can include a logic block 340 corresponding to instruction C. The logic block 340 may include a plurality of latches operable to store bit values of the entries of the row corresponding to instruction C. For example, the logic block 340 can include latches 330A, 330B, 330D, and 330E storing bit values 1, 0, 1, 0 for entries (C, A), (C, B), (C, D), and (C, E) in age array 144, respectively. The plurality of latches may be a part of a system memory of the system 100 or the memory 122. The processor 120 can be configured to modify the binary values stored in the plurality of latches to update the age array 144. The issue queue can include additional copies of the logic block 340 corresponding to other instructions in the issue queue 140. For example, the issue queue 140 may track six instructions A to F, and can include six copies of the logic block 340, where each copy of the logic block corresponds to an instruction among instructions A to F.

In an example, a ready bit 320 set to logic '1' can be transmitted to the logic block 340, indicating that instruction C is ready (e.g., all dependencies satisfied), valid for issue and that the execution unit 150b is ready to receive a load instruction. The ready bit 320 can be simultaneously transmitted to other copies of the logic block corresponding to the other instructions in the issue queue 140. For example, the ready bit 320 is also transmitted to a logic block corresponding to instruction A, and to another logic block corresponding instruction D. The logic block 340 corresponding to instruction C similarly receives the ready bit transmitted from the other instructions in the queue by means of ready-bit inputs 321. The logic block 340 corresponding to instruction C, shown in FIG. 3, receives the ready bit 320 and can output a selection signal based on the ready bit 320 and ready-bit inputs 321, the values stored in the latches 330A, 330B, 330D, 330E, and an instruction class signal 322. The selection signals, for example, can include a bit SEL_VS(i) that can be used to output instruction C to a vector/scalar execution unit, a bit SEL_LD(i) that can be used to output instruction C to a load execution unit (e.g., 150b), and a bit SEL_ST(i) that can be used to output instruction C to a store execution unit. The instruction class signal 322 may be a bit pattern indicating a type of the instruction corresponding to the logic block 340. For example, a format of the instruction class signal is (VS, LD, ST), and the logic block 340 corresponds to the load instruction C. As a result, the instruction class signal 322 for instruction C is 0, 1, 0 to indicate that instruction C is a LD instruction. The selection signal for instruction C corresponding to the instruction class of C can only be a '1' if C is ready to issue, and no other instruction in the same class as C is both ready (indicated by 321) and older (indicated by 330).

The logic block 340 includes a NOR gate 328, where the NOR gate 328 can output a logic '1' when all latches in the logic block 340 (e.g., 330A, 330B, 330D, 330E) are logic '0'. In the example shown in FIG. 3, since row C includes at least one logic '1', the NOR gate 328 can output a logic '0' if the corresponding ready-bit input (321A or 321D) is a '1'. A first set of AND gates 324 is operable to receive the ready bit 320 and the instruction class signal 322. In the example shown in FIG. 3, the set of AND gates 324 can output bits 0, 1, 0 based on the input ready bit 320 and instruction class signal 322. A second set of AND gates 326 is operable to receive the outputs from the set of AND gates 324 and the output from the NOR gate 328 and output selection signals indicating whether the corresponding instruction C shall be issued.

The age array 144 may not be updated when an instruction is removed from the queue due to issue or invalidation. The corresponding ready bit 320 for the removed instruction can be reset to '0', and the corresponding ready-bit input 321 to the logic block 340 will be '0'. Under this condition the latch reflecting the age array entry 330 for the column of the removed instruction can remain as a '0' or '1'. When the instruction queue entry corresponding to the removed or invalidated instruction is reassigned to a newly dispatching instruction, the age array row and column for the new instruction can be updated to reflect the correct relative age. Note that logic blocks for other instructions in the issue queue 140 can be operated in similar manner described above to determine whether to issue a corresponding instruction. A given instruction can be selected for issue if it is ready and no older instruction in the same class is also ready. Instructions from different classes can be simultaneously selected for issue.

Figure 4:
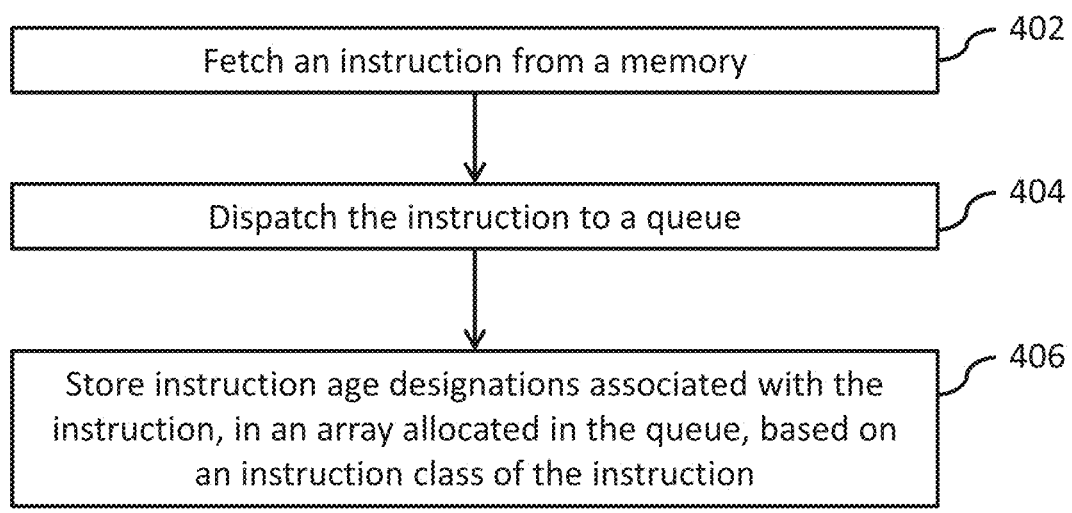
FIG. 4 is a flow diagram illustrating a process that can be performed by an instruction selection mechanism with class-dependent age-array in one embodiment.

FIG. 4 is a flow diagram illustrating a process that can be performed by a processor to implement an instruction selection mechanism with class-dependent age-array in one embodiment. An example process may include one or more operations, actions, or functions as illustrated by one or more of blocks 402, 404, and/or 406. Although illustrated as discrete blocks, various blocks may be divided into additional blocks, combined into fewer blocks, eliminated, or performed in parallel, depending on the desired implementation.

The process of FIG. 4 can begin at block 402. At block 402, a processor can fetch an instruction from a memory. The process can continue from block 402 to block 404. At block 404, the processor can dispatch the instruction to a queue. The process can continue from block 404 to block 406. At block 406, the processor can store instruction age designations associated with the instruction, in an array allocated in the queue, based on an instruction class of the instruction.

In some examples, the instruction can be an i-th instruction, and storing the instruction age designations can include writing an indicator to an entry of the array. The entry can be positioned at an i-th row and a j-th column of the array, where the j-th column can correspond to a j-th instruction of the instruction class, and the indicator can be indicative of the j-th instruction being older than the i-th instruction. In some examples, the entry can be a first entry, and the processor can write the indicator bit to a second entry of the array, where the second entry can be positioned at the i-th row and a k-th column, the k-th column can correspond to a k-th instruction, and the k-th instruction can be of the same instruction class as the i-th instruction and the j-th instruction. In some examples, the processor can store a zero in entries positioned in an i-th column of the array. In some examples, the processor can issue the j-th instruction to an execution unit prior to the i-th instruction. In some examples, the array can be an n×n array of rows and columns corresponding to n instructions, and an i-th row and an i-th column are associated with an i-th instruction.

Figure 5:
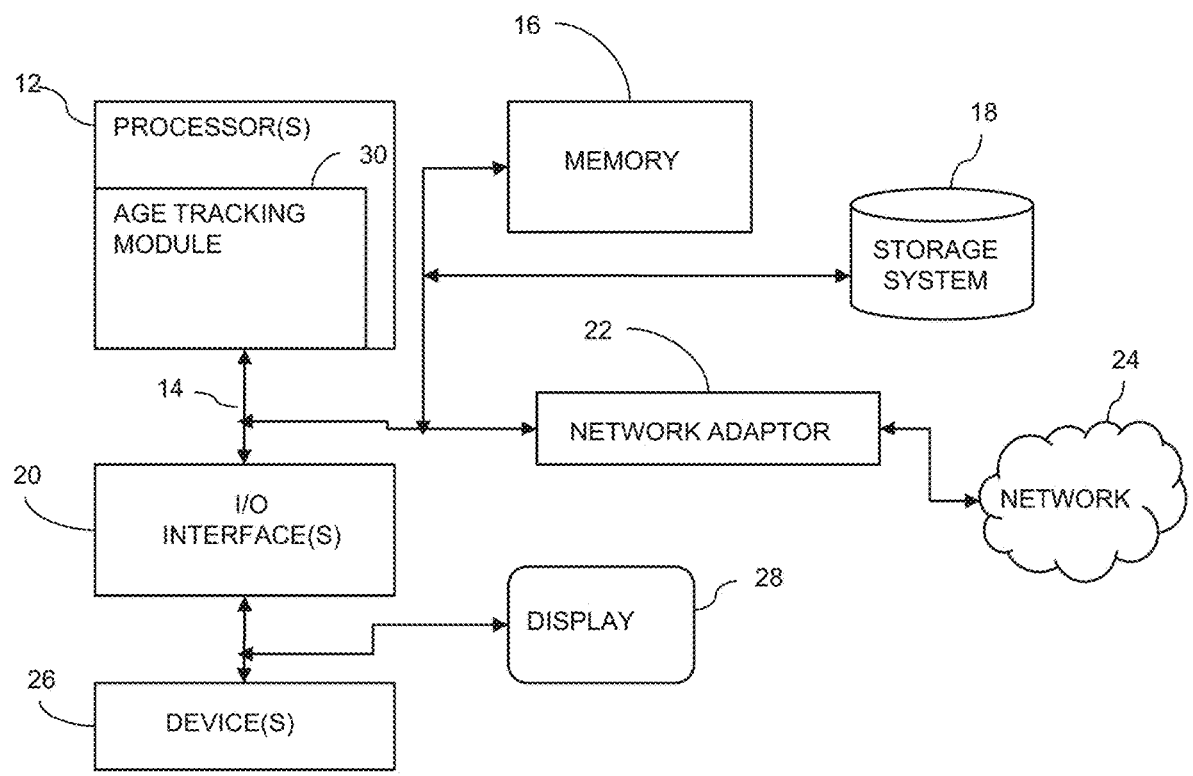
FIG. 5 illustrates a schematic of an example computer or processing system that may implement an instruction selection mechanism with class-dependent age-array in one embodiment.

FIG. 5 illustrates a schematic of an example computer or processing system that may implement an instruction selection mechanism with class-dependent age-array in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., instruction age module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a processor operable to at least sequence instructions;
a memory operatively coupled to the processor; and
an array allocated in the memory and operable to store instruction age designations associated with a plurality of instructions sequenced by the processor, the array arranged in a plurality of rows and columns, the array operable to store the instruction age designations based on instruction classes, the instruction age designations stored in the array indicating relative instruction ages among instructions in a same instruction class, wherein instructions in the same instruction class are executable by a same execution unit of the processor, and a bit value stored in an i-th row and j-th column indicates a relationship between the instruction corresponding to the j-th column and the instruction corresponding to the i-th row, wherein in a first case where the instruction corresponding to the j-th column is younger than the instruction corresponding to the i-th row and the instruction corresponding to the j-th column is in the same instruction class as the instruction corresponding to the i-th row, the bit value is a specific bit value, and in a second case where the instruction corresponding to the j-th column and the instruction corresponding to the i-th row are in different instruction classes, the bit value is the specific bit value.

2. The apparatus of claim 1, wherein the array is allocated in a queue operable to store the plurality of instructions and issue the plurality of instructions to execution units.

3. The apparatus of claim 1, wherein the array is an n×n array of rows and columns corresponding to n instructions, and an i-th column corresponds to the instruction corresponding to the i-th row.

4. The apparatus of claim 3, wherein the array is allocated in a queue operable to store the plurality of instructions and issue the plurality of instructions to execution units, the queue comprises n sets of a plurality of logic gates corresponding to the n instructions, and an i-th set of a plurality of logic gates is operable to determine whether the instruction corresponding to the i-th row should be selected for issue.

5. The apparatus of claim 1, wherein entries of an i-th column of the array being set to the specific bit value indicates that the instruction corresponding to the i-th row is a youngest instruction among the instructions of the same instruction class.

6. The apparatus of claim 1, wherein in a third case where the instruction corresponding to the j-th column is older than the instruction corresponding to the i-th row and the instruction corresponding to the j-th column is of the same instruction class as the instruction corresponding to the i-th row, the bit value is another bit value different from the specific bit value.

7. The apparatus of claim 6, wherein the i-th row including at least one instance of said another bit value indicates there is at least one instruction of the same instruction class older than the instruction corresponding to the i-th row.

8. A computer-implemented method comprising:
fetching an instruction from a memory;
dispatching the instruction to a queue; and
storing instruction age designations associated with the instruction, in an array allocated in the queue, based on an instruction class of the instruction, the array arranged in a plurality of rows and columns, the instruction age designations stored in the array indicating relative instruction ages among instructions in a same instruction class, wherein instructions in the same instruction class are executable by a same execution unit of the processor, the fetched instruction corresponds to an i-th row of the array, and a bit value stored in the i-th row and a j-th column indicates a relationship between the instruction corresponding to the j-th column and the fetched instruction corresponding to the i-th row, wherein in a first case where the instruction corresponding to the j-th column is younger than the fetched instruction corresponding to the i-th row and the instruction corresponding to the j-th column is in the same instruction class as the fetched instruction corresponding to the i-th row, the bit value is a specific bit value, and in a second case where the instruction corresponding to the j-th column and the fetched instruction corresponding to the i-th row are in different instruction classes, the bit value is the specific bit value.

9. The computer-implemented method of claim 8, wherein storing the instruction age designations comprises writing another bit value different from the specific bit value to the i-th row and the j-th column of the array to indicate that the instruction corresponding to the j-th column is older than the fetched instruction corresponding to the i-th row and the instruction corresponding to the j-th column is of the same instruction class as the fetched instruction corresponding to the i-th row.

10. The computer-implemented method of claim 9, further comprising writing said another bit value to the i-th row and a k-th column of the array to indicate that an instruction corresponding to the k-th column is older than the fetched instruction corresponding to the i-th row, wherein the instruction corresponding to the k-th column is of a same instruction class as the fetched instruction corresponding to the i-th row and the instruction corresponding to the j-th column.

11. The computer-implemented method of claim 9, further comprising setting the specific bit value in entries positioned in an i-th column of the array to indicate the fetched instruction corresponding to the i-th row is a youngest instruction among the instructions of the same instruction class.

12. The computer-implemented method of claim 9, further comprising issuing the instruction corresponding to the j-th column to an execution unit prior to issuing the fetched instruction corresponding to the i-th row.

13. The computer-implemented method of claim 8, wherein the array is an n×n array of rows and columns corresponding to n instructions, and an i-th column corresponds to the fetched instruction corresponding to the i-th row.

14. A system comprising:
a processor operable to at least sequence instructions;
a memory operatively coupled to the processor;
an array allocated in the memory and operable to store instruction age designations associated with a plurality of instructions sequenced by the processor, the array arranged in a plurality of rows and columns, the array operable to store the instruction age designations based on instruction classes such that the instruction age designations stored in the array indicating relative instruction ages among instructions in a same instruction class, wherein instructions in the same instruction class are executable by a same execution unit of the processor, and a bit value stored in an i-th row and j-th column indicates a relationship between the instruction corresponding to the j-th column and the instruction corresponding to the i-th row;
the processor being further operable to:
fetch the instruction corresponding to the i-th row from the memory;
dispatch the fetched instruction to a queue; and
store the instruction age designations associated with the instruction, in the array, based on an instruction class of the instruction, wherein in a first case where the instruction corresponding to the j-th column is younger than the fetched instruction corresponding to the i-th row and the instruction corresponding to the j-th column is in the same instruction class as the fetched instruction corresponding to the i-th row, the bit value is a specific bit value, and in a second case where the instruction corresponding to the j-th column and the fetched instruction corresponding to the i-th row are in different instruction classes, the bit value is the specific bit value.

15. The system of claim 14, wherein the instruction is an i-th instruction, and the processor is further operable to store the instruction age designations by writing another bit value different from the specific bit value in the i-th row and the j-th column of the array to indicate the instruction corresponding to the j-th column is older than the fetched instruction corresponding to the i-th row and the instruction corresponding to the j-th column is of the same instruction class as the fetched instruction corresponding to the i-th row.

16. The system of claim 15, wherein the processor is further operable to write said another bit value to the i-th row and a k-th column to indicate an instruction corresponding to the k-th column is older than the fetched instruction corresponding to the i-th row, wherein the instruction corresponding to the k-th column is of a same instruction class as the fetched instruction corresponding to the i-th row and the instruction corresponding to the j-th column.

17. The system of claim 15, wherein the i-th row including at least one instance of said another bit value indicates there is at least one instruction of the same instruction class older than the fetched instruction corresponding to the i-th row.

18. The system of claim 14, wherein the queue is operable to store the plurality of instructions and issue the plurality of instructions to execution units.

19. The system of claim 14, wherein the array is an n×n array of rows and columns corresponding to n instructions, and an i-th column corresponds to the instruction corresponding to the i-th row.

20. The system of claim 14, wherein entries of an i-th column of the array being set to the specific bit value indicates that the fetched instruction corresponding to the i-th row is a youngest instruction among the instructions of the same instruction class.

\* \* \* \* \*